United States Patent
Muramatsu

(10) Patent No.: US 10,335,912 B2
(45) Date of Patent: Jul. 2, 2019

(54) RADIATING STRUCTURE FOR MAIN SPINDLE IN MACHINING APPARATUS

(71) Applicant: FANUC Corporation, Yamanashi (JP)

(72) Inventor: Toshifumi Muramatsu, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/238,758

(22) Filed: Aug. 17, 2016

(65) Prior Publication Data
US 2017/0050283 A1    Feb. 23, 2017

(30) Foreign Application Priority Data
Aug. 20, 2015 (JP) .................................. 2015-163015

(51) Int. Cl.
*B23Q 11/12*    (2006.01)
*F28F 13/12*    (2006.01)
*F28F 1/30*    (2006.01)

(52) U.S. Cl.
CPC ............ *B23Q 11/127* (2013.01); *B23Q 11/12* (2013.01); *B23Q 11/122* (2013.01); *F28F 1/30* (2013.01); *F28F 13/125* (2013.01)

(58) Field of Classification Search
CPC ..... B23Q 11/122; B23Q 11/127; B23Q 11/12; F28F 1/30; F28F 13/125
USPC ........................................................ 165/80.1
See application file for complete search history.

(56) References Cited

U.S. PATENT DOCUMENTS

| | | | | |
|---|---|---|---|---|
| 1,635,769 A | * | 7/1927 | Royle .................. | B23Q 11/005 416/237 |
| 5,088,362 A | * | 2/1992 | Schalles ............... | B23Q 11/127 310/417 |
| 5,150,994 A | * | 9/1992 | Hsu ....................... | B23B 31/263 384/241 |
| 5,290,130 A | * | 3/1994 | Beretta ................ | B23Q 11/127 409/131 |

(Continued)

FOREIGN PATENT DOCUMENTS

EP          1065028 A1 *  1/2001  ............... B23Q 5/10
JP          S52-132374 U    10/1977
(Continued)

OTHER PUBLICATIONS

WO 2009107493 A1 Machine Translation English—Retrieved Jul. 2017.*

(Continued)

*Primary Examiner* — Cassey D Bauer
*Assistant Examiner* — Jenna M Hopkins
(74) *Attorney, Agent, or Firm* — Hauptman Ham, LLP

(57) ABSTRACT

In a radiating structure for a main spindle having a tapered bore formed at a distal end of the main spindle, into which a tapered portion of a tool holder is mounted, a key fixing member provided with a drive key is fixed to the distal end of the main spindle, and the drive key is fit into a key groove formed in the tool holder. This configuration prevents a phase shift in rotation direction of the tool holder arising from rotation of the main spindle. A radiating member which exchanges heat with an ambient atmosphere is provided to the key fixing member provided with the drive key.

10 Claims, 4 Drawing Sheets

(56) References Cited

U.S. PATENT DOCUMENTS

| | | | | |
|---|---|---|---|---|
| 5,593,258 A | * | 1/1997 | Matsumoto | B23B 31/006 279/103 |
| 5,772,367 A | * | 6/1998 | Daniel | B23Q 11/0046 173/75 |
| 2003/0170087 A1 | * | 9/2003 | Sugata | B23Q 11/1023 409/136 |
| 2009/0265783 A1 | * | 10/2009 | Huynh | G06F 21/6218 726/22 |
| 2010/0086373 A1 | * | 4/2010 | Kleiner | B23D 77/006 408/1 R |
| 2011/0001282 A1 | * | 1/2011 | Taniguchi | B23Q 1/522 269/55 |
| 2012/0121354 A1 | * | 5/2012 | Dickey | B23B 31/02 409/131 |
| 2013/0327505 A1 | * | 12/2013 | Gonzalez | F28F 3/00 165/104.26 |
| 2014/0020919 A1 | * | 1/2014 | Dvorak | B25F 5/00 173/75 |
| 2015/0345510 A1 | * | 12/2015 | Beers | F04D 29/5853 415/180 |
| 2017/0341115 A1 | * | 11/2017 | Noll | B08B 15/04 |
| 2018/0154507 A1 | * | 6/2018 | Roehm | B25B 21/02 |
| 2018/0175703 A1 | * | 6/2018 | Zahradsky | H02K 9/06 |

FOREIGN PATENT DOCUMENTS

| | | | | |
|---|---|---|---|---|
| JP | 61-1345 U | | 1/1986 | |
| JP | S611345 U | * | 1/1986 | |
| JP | 61025747 A | * | 2/1986 | B23Q 11/127 |
| JP | 62004550 A | * | 1/1987 | B23Q 1/0027 |
| JP | H0457650 A | * | 2/1992 | |
| JP | H10337625 A | * | 12/1998 | |
| JP | 11090751 A | * | 4/1999 | |
| JP | H11-235608 A | | 8/1999 | |
| JP | WO 2009107493 A1 | * | 9/2009 | B23Q 1/522 |
| JP | 2010149227 A | * | 7/2010 | B23B 31/265 |
| JP | 2013-91134 A | | 5/2013 | |
| JP | 2013091134 A | * | 5/2013 | |
| JP | 2013226616 A | * | 11/2013 | |
| JP | 2014062620 A | | 4/2014 | |
| JP | 2014117119 A | * | 6/2014 | |

OTHER PUBLICATIONS

JP 11090751 A Machine Translation English—Retrieved Jul. 2017.*
JP61025747A Machine Translation English—Retrieved Jul. 2017.*
JPH1190751A Machine Translation English—Retrieved Jul. 2017.*
Thermal Conductivity of Engineering Materials—Blumm (Jan. 2013).*
JP2013226616A Machine Translation English—Retrieved Nov. 2017.*
JP S611345 U Machine Translation English—Retrieved May 2018.*
JP H10-337625 A Machine Translation English—Retrieved Jul. 2017.*
JP2013226616A Machine Translation English—Retrieved Jul. 2017.*
Ghoshdastidar, P.S.. (2012). Heat Transfer (2nd Edition). Oxford University Press.*
JP 2013091134 A Machine Translation English—Retrieved May 2018.*
JP2014117119A Machine Translation English—Retrieved May 2018.*
JPH0457650A Machine Translation English—Retrieved May 2018.*
Notice of Allowance in Japanese Application No. 2015-163015, dated Jun. 19, 2018, 6pp.
Office Action in JP Application No. 2015-163015, dated Sep. 12, 2017, 7 pp.

* cited by examiner

RADIATING STRUCTURE FOR MAIN SPINDLE IN MACHINING APPARATUS

RELATED APPLICATIONS

The present application claims priority to Japanese Patent Application Number 2015-163015, filed Aug. 20,2015, the disclosure of which is hereby incorporated by reference herein in its entirety.

BACKGROUND OF THE INVENTION

1. Field of the Invention

The present invention relates to a radiating structure for a main spindle in a machining apparatus.

2. Description of the Related Art

Since a bearing or the like in a machine tool generates heat due to rotation of a main spindle to bring about thermal displacement or a rise in the pressure on a bearing and affect machining accuracy, a main spindle in a machining apparatus has a cooling structure in order to curb a rise in the temperature of the main spindle.

As a prior art technique pertaining to a cooling structure for a main spindle in a machining apparatus, for example, Japanese Patent Application Laid-Open No. 2014-062620 discloses a structure for a main spindle adopting lubrication of a bearing with air oil, in which air cooling a shaft and the bearing of the main spindle and air oil for lubrication are not mixed together.

Japanese Patent Application Laid-Open No. 2014-117119 discloses a structure which is provided with a cooling air passage along an axial center of a main spindle and includes a blowing section that sucks in outside air from a proximal end of the cooling air passage along with rotation of the main spindle and pressure-feeds the air in an axial center direction of the main spindle.

In a machining apparatus which performs machining with a tool mounted at a distal end of a main spindle, the main spindle distal end includes a drive key for preventing a phase shift in rotation direction between the main spindle and the tool. In connection with this, Japanese Patent Application Laid-Open No. 10-337625 discloses a structure in which drive keys are attached to a distal end of a main spindle by fixing a ring plate that is a ring-like member provided with the drive keys to the distal end of the main spindle, and a distal end portion of the main spindle does not enlarge by a centrifugal force due to absence of a key groove at the main spindle distal end portion.

The aforementioned technique disclosed in Japanese Patent Application Laid-Open No. 2014-062620 implements cooling of the shaft and the bearing as cooling targets by supplying air for cooling but suffers from the problem of the need for a complicated mechanism or complicated equipment.

The technique disclosed in Japanese Patent Application Laid-Open No. 2014-117119 implements cooling of a shaft and a bearing as cooling targets by providing the cooling air passage at the axial center and sucking in outside air from the blowing section provided at the proximal end of the cooling air passage along with rotation of the main spindle. In a machining apparatus, a mechanism for grasping a tool at a main spindle distal end is generally provided at an axial center, and application of the technique to the machining apparatus is difficult.

SUMMARY OF THE INVENTION

An object of the present invention is to provide a radiating structure for a main spindle which does not need a complicated mechanism or complicated equipment and is applicable to a main spindle having a general structure that has a mechanism to grasp a tool in a machining apparatus.

The present invention solves the above-described problems by providing a radiator plate or a blade for heat radiation at a member including a drive key at a main spindle distal end.

In a radiating structure for a main spindle in a machining apparatus according to the present invention, a tapered bore is formed at a distal end of the main spindle, a tapered portion of a tool holder is detachably mounted into the tapered bore, a key fixing member provided with a drive key is fixed to the distal end of the main spindle, and the drive key is fit into a key groove formed in the tool holder. This configuration prevents a phase shift in rotation direction of the tool holder arising from rotation of the main spindle. A radiating member which exchanges heat with an ambient atmosphere is provided to the key fixing member provided with the drive key.

The radiating member may be shaped to extend from a base of the key fixing member in a radial direction. In this case, a groove for increasing an area of contact with the atmosphere and agitating the atmosphere may be formed in the radiating member.

The radiating member may include at least one blade-like member which extends from a base of the key fixing member in a radial direction.

The present invention does not need a complicated mechanism or complicated equipment and allows cooling of a shaft and a bearing in a main spindle having a general structure which has a mechanism to grasp a tool in a machining apparatus.

BRIEF DESCRIPTION OF THE DRAWINGS

The above and other objects and features of the present invention will be apparent from the following description of embodiments with reference to the appended drawings, in which.

DETAILED DESCRIPTION OF THE PREFERRED EMBODIMENTS

The structure of a main spindle having a radiating structure according to a first embodiment of the present invention will be described with reference to FIG. 1.

Figure 1:
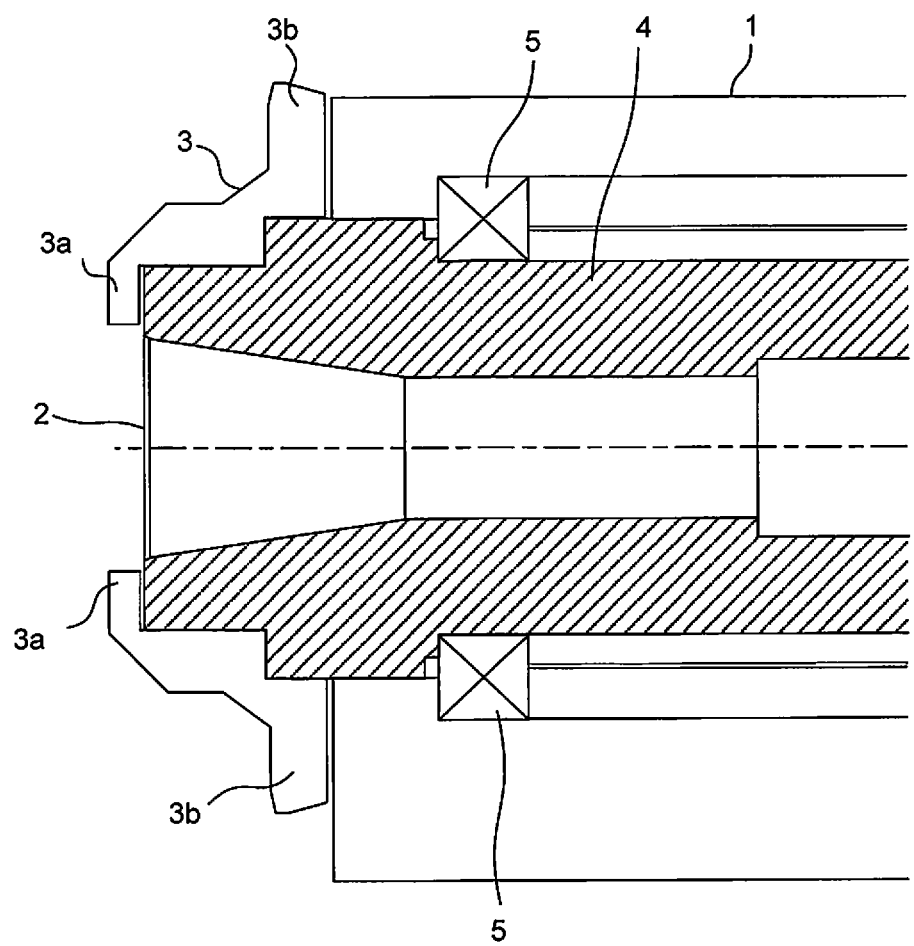
FIG. 1 is a schematic view for explaining the structure of a main spindle having a radiating structure according to a first embodiment of the present invention.

As shown in FIG. 1, a main spindle 1 of a machining apparatus has a tapered bore formed at a distal end and is structured such that a tool held by a tool holder can be attached by detachably mounting a tapered portion of the tool holder into the tapered bore. A key fixing section 3 is fixed to a distal end 2 of the main spindle 1. The key fixing section 3 includes a drive key 3a for a tool and a main spindle to rotate integrally without any phase shift in rotation direction and a metallic radiating member 3b.

As in techniques described in Japanese Patent Application Laid-Open No. 10-337625 mentioned earlier and the like, the drive key 3a prevents a shift in rotation direction of a tool which fits in a key groove formed in a tool holder (not shown) from a main spindle. The radiating member 3b is shaped to extend from a base of the key fixing section 3 in a radial direction and increases heat capacity of the main spindle 1. When the main spindle 1 rotates, the key fixing section 3 fixed to the main spindle 1 rotates together to exchange heat with an ambient atmosphere. In this manner, a shaft 4 and a bearing 5 of the main spindle 1 are cooled.

The structure of a main spindle having a radiating structure according to a second embodiment of the present invention will be described with reference to FIGS. 2 and 3.

Figure 2:
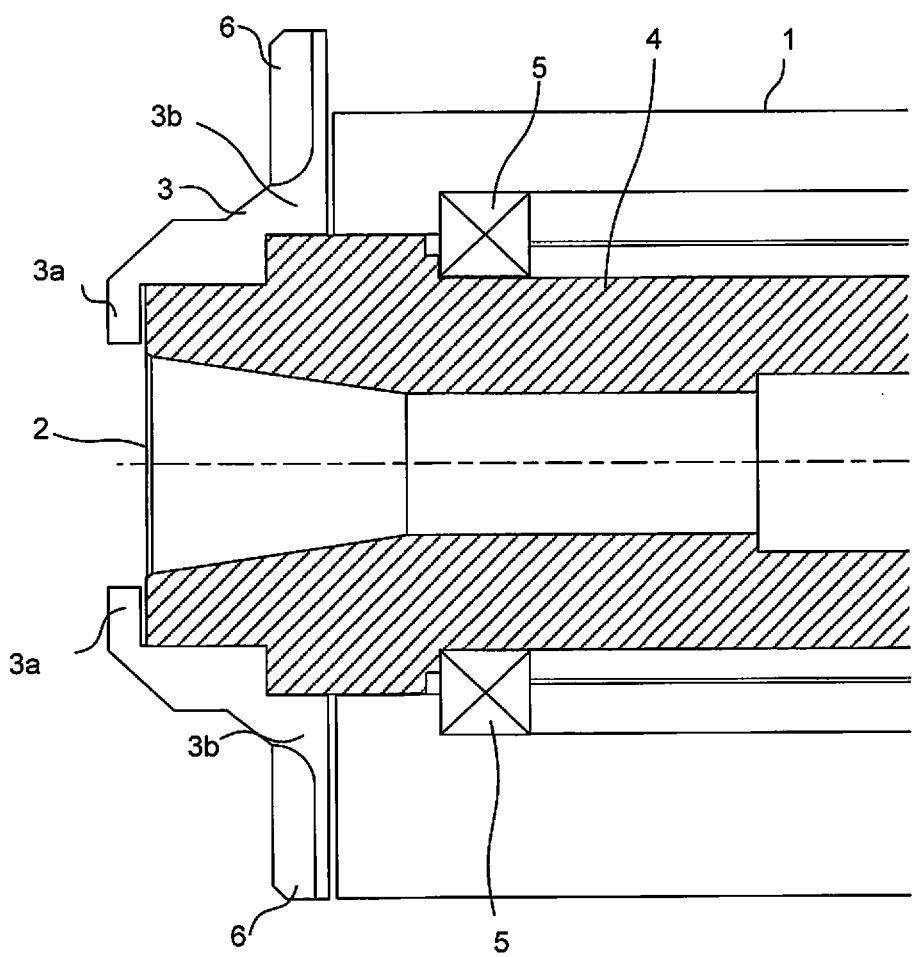
FIG. 2 is a schematic view for explaining the structure of a main spindle having a radiating structure according to a second embodiment of the present invention.

As shown in FIG. 2, in a main spindle 1, grooves 6 are formed in a radiating member 3b of the main spindle 1 to increase an area of contact of the radiating member 3b with an atmosphere. When the grooves 6 rotate, the grooves 6 agitate an ambient atmosphere. The grooves 6 formed in the radiating member 3b are capable of cooling a portion other than the main spindle 1 by agitating an atmosphere inside a cover covering a machine, to which the main spindle 1 is attached.

Figure 3:
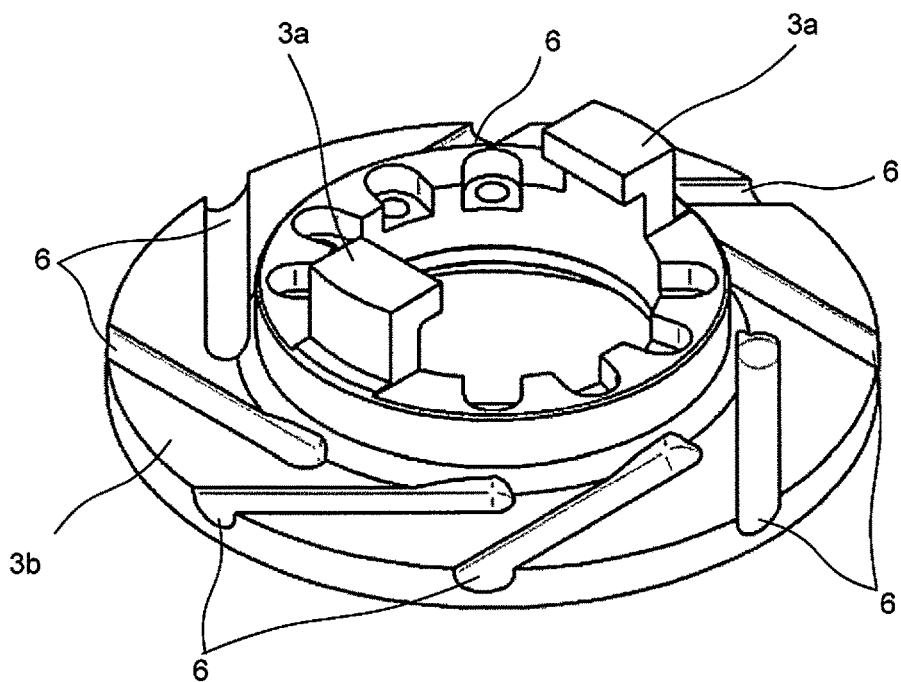
FIG. 3 is a perspective view of a key fixing section in the radiating structure shown in FIG. 2.

FIG. 3 is a perspective view of a key fixing section 3 shown in FIG. 2. Drive keys 3a and the radiating member 3b constituting a key fixing section 3 are constructed as a single-piece member.

Figure 4:
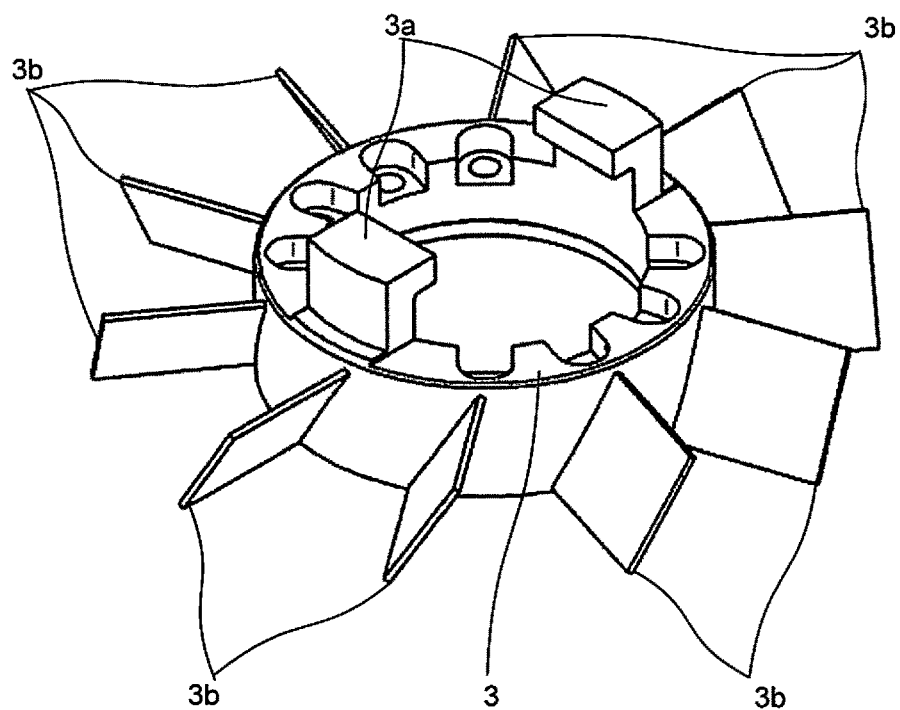
FIG. 4 is a schematic view for explaining the structure of a main spindle having a radiating structure according to a third embodiment of the present invention.

FIG. 4 is a perspective view of a key fixing section 3 alone according to another embodiment of the present invention.

The structure of a main spindle having a radiating structure according to a third embodiment of the present invention will be described with reference to FIG. 4.

As shown in FIG. 4, a radiating member 3b has a finny (blade-like) shape extending from a base of the key fixing section 3 in a radial direction and is shaped to agitate an ambient atmosphere to a greater degree than the radiating member shown in FIG. 3.

Figure 5:
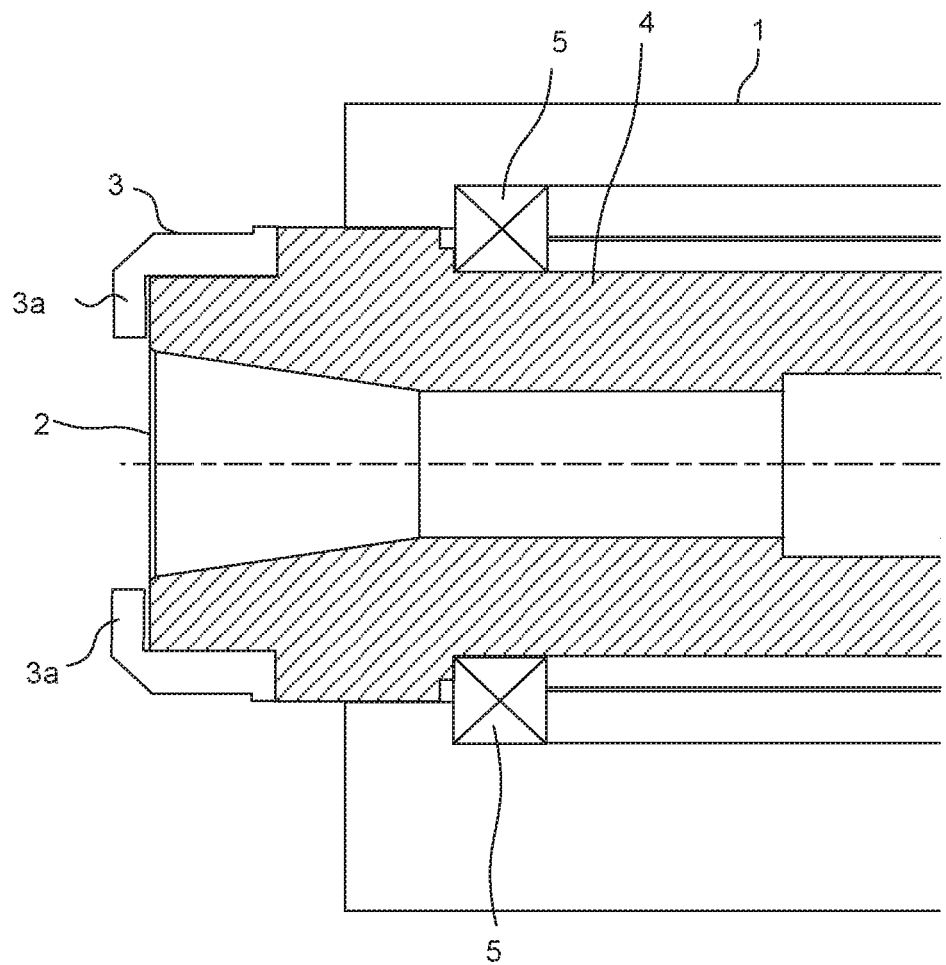
FIG. 5 is a schematic view showing the structure of a main spindle according to a prior art technique.

FIG. 5 is a schematic view showing the configuration of a main spindle according to a prior art technique.

In a main spindle 1, a key fixing section 3 is not designed with heat radiation in mind. The key fixing section 3 has low heat capacity and is not shaped to actively change heat with an ambient atmosphere.

In contrast, in the present invention, as described with reference to FIGS. 1 to 4, the key fixing section 3 is shaped to increase heat capacity and actively exchange heat with an ambient atmosphere, in view of heat radiation by the key fixing section 3. For this reason, cooling of a shaft and a bearing of a main spindle can be performed without provision of a complicated mechanism or complicated equipment.

Note that the shape of a radiating member is not limited by the above-described embodiments. To increase heat dissipation, a groove is formed in a radiating member or a radiating member itself is shaped like a fan to agitate an atmosphere in the embodiments. Besides these, it is possible to vary the thickness of a disk with a radial position in the disk-like radiating member shown in FIG. 2 or adopt a polygonal shape as the outer shape of the disk.

As methods for fastening a key fixing section to a distal end of a main spindle, fastening with a bolt, bonding, shrinkage fitting, press fitting, and the like are generally conceivable. Any fastening method may be employed in the present invention.

Although a radiating member is made of metal in the above-described embodiments, a radiating member may be made using a resin with high thermal conductivity or the like instead of metal. A radiating member may be made of the same material as a key fixing section and be integral with the key fixing section or may be made of a different material. In the latter case, the radiating member and the key fixing section may be fixed through, for example, fastening with a bolt.

The invention claimed is:

1. A radiating structure for a main spindle in a machining apparatus, the radiating structure comprising:
    a drive key fixing member having a drive key configured to prevent a phase shift in a rotation direction of a tool holder arising from rotation of the main spindle when the drive key fixing member is fixed to a distal end of the main spindle, and
    a tapered portion of the tool holder is detachably mounted into a tapered bore formed at the distal end of the main spindle so that the drive key is fit into a key groove formed in the tool holder; and
    a radiating member configured to exchange heat with an ambient atmosphere as the drive key fixing member rotates together with the rotation of the main spindle, wherein
    the drive key fixing member has an annular hub which has, along an axial direction of the main spindle, a front end and a rear end,
    the drive key has
        a first portion that extends from the front end of the annular hub forward along the axial direction of the main spindle, and
        a second portion that extends from a front end of the first portion, inwardly in a radial direction of the main spindle,
    the radiating member extends from an outer circumferential surface of the annular hub outwardly in the radial direction of the main spindle and has a front side facing toward the drive key in the axial direction of the main spindle,
    the radiating member includes a plurality of grooves formed on the front side for increasing an area of contact with the atmosphere and agitating the atmosphere,
    the radiating member is integral with the drive key fixing member,
    the radiating member is of a same material as the drive key fixing member, and
    the radiating member and the drive key fixing member are part of a unitary body of said material.

2. The radiating structure for the main spindle in the machining apparatus according to claim 1, wherein
    the radiating member has a shape of a disk extending around and outwardly from the rear end of the annular hub.

3. The radiating structure for the main spindle in the machining apparatus according to claim 2, wherein
    at least one groove of the plurality of grooves is formed on a surface of the disk for increasing the area of contact with the atmosphere and agitating the atmosphere, and
    the surface of the disk on which the at least one groove of the plurality of grooves is formed is the front side facing toward the drive key.

4. The radiating structure for the main spindle in the machining apparatus according to claim 1, wherein
    the outer circumferential surface extends along the axial direction of the main spindle and connects the front end and the rear end of the annular hub.

5. The radiating structure for the main spindle in the machining apparatus according to claim 1, wherein
the radiating member is fastened by a bolt to the drive key fixing member.

6. The radiating structure for the main spindle in the machining apparatus according to claim 1, wherein
the drive key fixing member has a further drive key spaced circumferentially from the drive key, the further drive key having
a third portion that extends from the front end of the annular hub forward along the axial direction of the main spindle, and
a fourth portion that extends from a front end of the third portion, inwardly in the radial direction of the main spindle toward the drive key.

7. The radiating structure for the main spindle in the machining apparatus according to claim 2, wherein
the plurality of grooves is formed on a surface of the disk for increasing the area of contact with the atmosphere and agitating the atmosphere, and
the surface of the disk on which the plurality of grooves is formed is the front side facing toward the drive key.

8. The radiating structure for the main spindle in the machining apparatus according to claim 7, wherein
each of the plurality of grooves is slanted with respect to the radial direction.

9. The radiating structure for the main spindle in the machining apparatus according to claim 7, wherein
the drive key fixing member has a further drive key spaced circumferentially from the drive key, the further drive key having
a third portion that extends from the front end of the annular hub forward along the axial direction of the main spindle, and
a fourth portion that extends from a front end of the third portion, inwardly in the radial direction of the main spindle toward the drive key.

10. The radiating structure for the main spindle in the machining apparatus according to claim 4, wherein
the drive key fixing member has a further drive key spaced circumferentially from the drive key, the further drive key having
a third portion that extends from the front end of the annular hub forward along the axial direction of the main spindle, and
a fourth portion that extends from a front end of the third portion, inwardly in the radial direction of the main spindle toward the drive key.

* * * * *